Patented Feb. 10, 1948

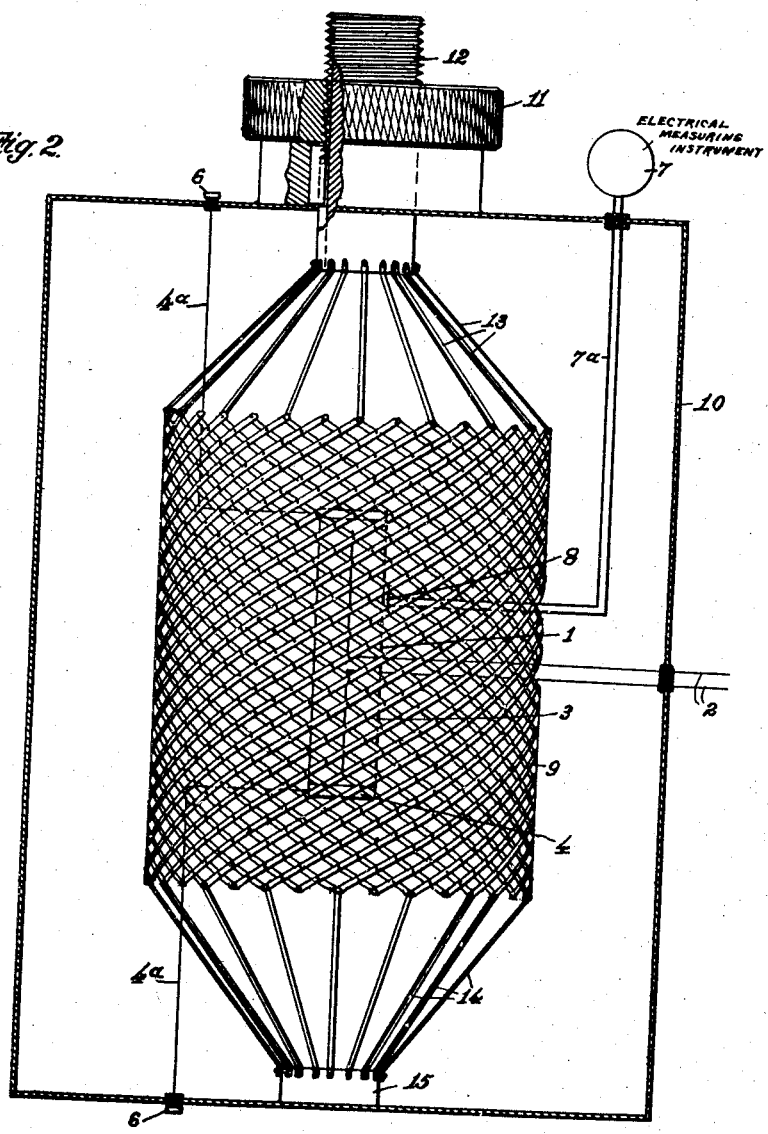

2,435,597

UNITED STATES PATENT OFFICE 2,435,597

DISSIPATIVE LOAD AND WATTMETER FOR ULTRA HIGH FREQUENCY ELECTRIC POWER

Eric Balliol Moullin, Brooklands, Sale, England, assignor to Metropolitan-Vickers Electrical Company Limited, London, England, a company of Great Britain Application March 9, 1945, Serial No. 581,920
In Great Britain June 11, 1943

Section 1, Public Law 690, August 8, 1946
Patent expires June 11, 1963

6 Claims. (Cl. 171—95)

1

The purpose of this invention is to provide a load of known and adjustable impedance for dissipation of ultra high frequency electric power and at the same time for measuring the amount of power so dissipated. In the processes of testing and adjusting ultra high frequency generators there is often required a load resistance to simulate the aerial which said generator will ultimately supply. It is therefore required that said load shall have the same impedance as that of the aerial, shall be capable of dissipating the power without overheating and shall give a measure of the dissipation. The many practical and technical difficulties of producing a load having these desired properties are well known to radio engineers and need not be indicated herein.

According to the present invention the dummy load is an aerial itself which radiates power in precisely the way it would do if free in space, but is enclosed in a box of construction such that it substantially absorbs all the radiated power and yet in so doing has no reaction on the radiating aerial which is therefore, in effect, in free space. The amount of power radiated can if desired be measured by a thermometer suitably placed within the said box the construction of which is particularly suited to such measurements.

As set forth in earlier specification of United States patent application Serial No. 581,919, filed of even date herewith, a non-reflecting chamber can be constructed by providing a closed metal chamber with an internal shell of thin material having a relatively high electrical resistivity, provided the said shell is spaced one quarter of a wavelength from the external metal wall.

According to the present invention any convenient form of aerial, such for example as a half wave aerial, is placed inside a thin tube of the aforesaid resistive material. The tube may fit fairly closely round the aerial rod or may have a larger diameter: the decision as to the diameter will depend on the number of watts to be dissipated in the tube. Then the aerial, sheathed in the aforesaid manner, is placed coaxially within a closed metal cylinder whose radius exceeds that of the sheath tube by one quarter of a wavelength. The material of the resistive sheath tube must be such that the resistance of a strip one inch wide and twelve inches long must be near 1440π ohms. Experience has shown such a material can readily be made from paper impregnated with colloidal graphite and accordingly can readily be formed into a tube. If necessary the graphite treated paper can be wound on a "Bakelite" tube for further mechanical support but for the indicating aspect of this invention it is better it should be self-supporting. It may be noted here the correct resistivity is partially a function of the radius of the sheath tube. Provided this radius is not less than 0.16λ then the correct value differs by less than one per cent from the value stated above: but if the radius is 0.016λ then it should be about 740π ohms. The treated paper can probably dissipate at least one watt per square inch of area and the radius of the tube should be chosen to suit the dissipation required. A suitable thermo-couple, or several such couples in series, can be attached to the wall of the tube, which has a conveniently small thermal capacity, and used to indicate the temperature rise. The tube can be calibrated by passing a steady current through it, suitable terminal leads being attached by, say, copper plating at the ends, for this purpose, and thus the galvanometer activated by the couples can be calibrated to read directly in watts dissipated.

If the clearance between the sheath and the external metal cylinder is not λ/4 then the impedance of the aerial will have a reactive component and a resistance less than the free space value. Accordingly if the diameter of the external cylinder is made adjustable the impedance of the load will also become adjustable and this is often convenient in practice as a means of adjusting the load to the generator. One convenient way of providing said adjustment is to construct a cylinder as a diamond mesh network of thin rods pin jointed at their crossings, in the manner of "lazy tongs": and such is capable of considerable change of radius while still remaining substantially a circular cylinder. This said lattice cylinder may be inserted within a larger metal cylinder which will afford mechanical protection.

The whole device may be contained in a substantial though light metal drum, with an indicator or meter on top calibrated directly in watts. Terminals may be provided for calibration with direct current. A screened cable emerges from the wall of the cylinder, being attached to the aerial at one end and at the other to a suitable plug for connecting to a cable leading from any generator.

The arrangement thus forms a self-contained dissipative load and watt meter. Whilst the principle involved in this invention is applicable at any wavelength, the apparatus may become cumbersome for some wavelengths greater than, say 3/2 metres.

For the fuller understanding of the invention it will now be described by way of example with reference to the accompanying drawings, which are purely diagrammatic and not to scale.

Fig. 2 is an axial section, partly in elevation, of another embodiment of the invention.

Figure 1:
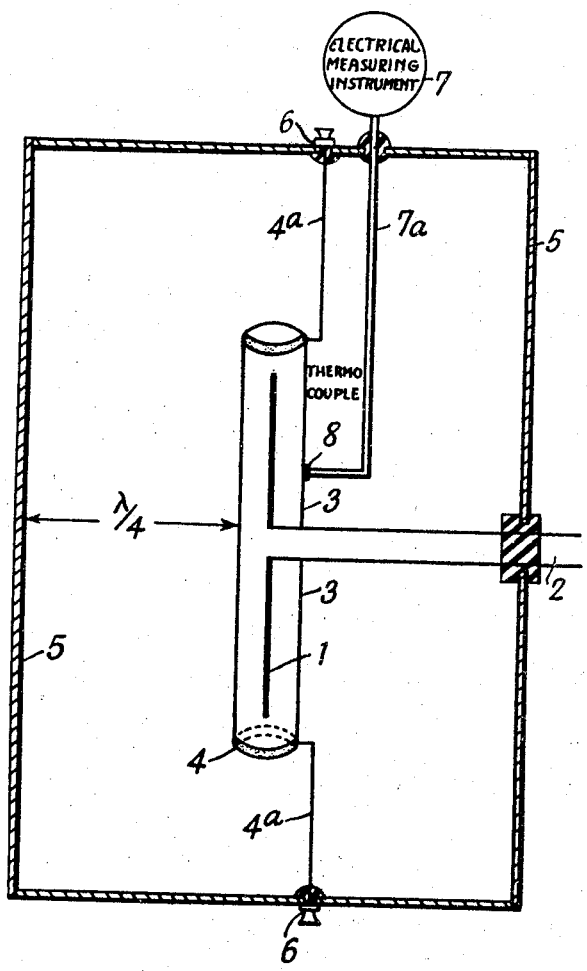
Fig. 1 is a diagrammatic view of one embodiment of the present invention.

Referring to Fig. 1 of the drawing, at 1 is shown an ordinary half-wave aerial rod with which is connected the feed lines 2. At 3 is shown the tube of resistive material axially in which is located the aerial 1. The tube 3 is shown as transparent in order that the aerial may be seen. At 4 are shown the copper-plated ends of the resistive tube 3 for the connection to the tube of terminal leads 4a.

At 5 is shown the external metallic cylinder having closed ends.

The leads 4a pass through the ends of the metal cylinder 5 to terminals 6 to permit calibration.

At 7 is shown an electrical measuring instrument such as a galvanometer or fractional ammeter connected by leads 7a to a thermo-couple 8 on the wall of the tube 3.

The radial distance between tube 3 and the cylinder 5 is one-quarter of a wavelength as indicated by $\lambda/4$. The arrangement shown in the drawing is otherwise constructed or may be modified and is adapted to be used as hereinbefore set forth.

Fig. 2 illustrates an embodiment of the invention wherein the diameter of the external or electrically conductive cylinder is adjustable. In this modified arrangement, the external cylinder 5 of Fig. 1 is replaced by a lattice cylinder 9 located within a fixed box 10, the lattice cylinder being composed of thin rods pin-jointed or pivotally connected at their intersections and providing a diamond mesh network. Adjustment of the lattice cylinder is effected by rotating a knob 11 threaded on a central rod 12 which is splined in the top of the box 10 and is moved vertically as said knob is rotated. Control rods 13 are connected by pin-joints to the lower end of the rod 12 and to the upper edge of the lattice cylinder, and similar rods 14 connect the lower edge of the lattice cylinder with a member 15 which is fixed in the bottom of the fixed box 10. By this construction, upward movement of the rod 12 will contract the lattice cylinder and thereby reduce its diameter and the spacing between it and the resistive cylinder, and downward movement of the rod 12 will cause the lattice cylinder to expand in diameter and thereby increase its diameter and said spacing. The lattice cylinder, because of its "lazy tongs" structure, will maintain its cylindrical form during its contraction and expansion.

In some applications the device according to the invention may be needed only as a dissipative load, and not simultaneously as a means of measuring the power dissipated in it. In this case the thermo-couple system can if desired be omitted, or alternatively only a single thermo-couple retained for possible use as desired as a rough indicator during preliminary adjustment. In this case, furthermore, there is no need to keep small the heat capacity of the dissipating tube 3: thus the carbon or other resistive material can be painted on a relatively more robust tube such as of the material known in the trade under the registered British trade-mark "Bakelite," or embedded on a tube of the material known in the trade under the registered British trade-mark "Traffolyte." Thus not only can a much more robust mechanical construction be obtained, but the resistive properties of the tube remain appreciably more constant than is possible with a thin paper tube.

On the other hand when the device is required to act as its own watt meter measuring the power by the above described method, it is highly desirable that the heat capacity of the graphite cylinder shall be as small as is reasonably possible in order that the time lag of thermal response shall be desirably small. In this case in actual practice the tube has been made of a single sheet of graphite-loaded paper such as is readily obtainable on the market. Experience has shown that the ohmic resistance of such a tube tends to increase in damp weather, and accordingly it may be desirable to protect it from moisture; whilst most insulating varnishes have been found impracticable for protecting the tube against moisture owing to the fact that they wet the paper, causing its fibres to expand, with deterioration of the graphitic film. However, completely satisfactory results have been obtained by soaking the graphite paper tube in molten paraffin wax, which material does not "wet" the paper, and such tubes remain permanent indefinitely. Waxes of high melting point may be preferred in order to increase the permissible temperature.

The device has been operated in conjunction with a "standing wave detector" in the cable 2 feeding the aerial 1, said detector serving to indicate the degree of match between the load and the cable. Experience shows that the match can be adjusted conveniently by varying the diameter of the external metal cylinder such as by giving it the construction hereinbefore set forth. Analysis has shown that the adjustment for match should be conveniently blunt, as distinct from sharp, when the clearance is of the order of one-quarter wavelength, and this is borne out in actual practice.

Experience has shown that the load device according to the invention is practicable and workable. The invention is not limited to any particular use, since it may be employed in various applications.

What I claim as new and desire to secure by Letters Patent of the United States is:

1. Apparatus for measuring ultra high frequency power, comprising an aerial adapted to be supplied with the power to be measured, an electrically resistive cylindrical sheath surrounding said aerial, an electrically conductive cylinder enclosing said resistive sheath and radially spaced therefrom approximately $\lambda/4$, and means for measuring the heating effect produced in said resistive sheath.

2. Apparatus for measuring ultra high frequency power, comprising an aerial adapted to be supplied with the power to be measured, an electrically resistive cylindrical sheath surrounding said aerial, an electrically conductive cylinder enclosing said resistive sheath and radially spaced therefrom approximately a quarter the wavelength of the energy to be measured, means for forming a thermo couple on the surface of the resistive sheath, an electrical measuring instrument located externally of the conductive cylinder, and electrical leads connecting the thermo couple and the electrical measuring instrument.

3. Apparatus for measuring ultra high frequency power, comprising an aerial adapted to be supplied with the power to be measured, an electrically resistive cylindrical sheath surrounding said aerial, said resistive sheath having a radius at least $0.16\lambda$ and being such that the resistance of a strip one inch wide and twelve inches long is of the order of $1440\pi$ ohms, an electrically conductive cylinder enclosing said resistive sheath and spaced therefrom approximately $\lambda/4$, and means for measuring the heating effect produced in said resistive sheath.

4. Apparatus for measuring ultra high frequency power, comprising an aerial adapted to be supplied with the power to be measured, an electrically resistive cylindrical sheath surrounding said aerial, said sheath having a radius less than $0.1\lambda$ and a resistance such that a strip one inch wide and twelve inches long has a resistance of the order of $740\pi$ ohms, an electrically conductive cylinder enclosing said resistive sheath and radially spaced therefrom approximately $\lambda/4$, and means for measuring the heating effect produced in said resistive sheath.

5. Apparatus for measuring ultra high frequency power, comprising an aerial adapted to be supplied with the power to be measured, an electrically resistive cylindrical sheath surrounding said aerial, an electrically conductive cylinder enclosing said resistive sheath, means for varying the diameter of said conductive cylinder so as to effect a spacing of the conductive cylinder from the resistive sheath of $\lambda/4$, and means for measuring the heating effect produced in said resistive sheath.

6. Apparatus for dissipating ultra high frequency power, comprising an aerial adapted to be supplied with power, an electrically resistive sheath surrounding said aerial, an electrically conductive cylinder surrounding said resistive sheath, and means for adjusting the diametrical dimension of said conductive cylinder so as to effect a radial spacing of the cylinder from the sheath of $\lambda/4$.

ERIC BALLIOL MOULLIN.

REFERENCES CITED

The following references are of record in the file of this patent:

UNITED STATES PATENTS

| Number | Name | Date |
|---|---|---|
| 2,245,669 | Hollmann | June 17, 1941 |
| 2,284,379 | Dow | May 26, 1942 |
| 1,921,117 | Darboard | Aug. 8, 1933 |